US012179313B2

(12) United States Patent
Nelson

(10) Patent No.: US 12,179,313 B2
(45) Date of Patent: Dec. 31, 2024

(54) APPARATUS, SYSTEMS AND METHODS FOR CLEANING AND POLISHING ACCESSORIES

(71) Applicant: Clinton D. Nelson, Wauconda, IL (US)

(72) Inventor: Clinton D. Nelson, Wauconda, IL (US)

( * ) Notice: Subject to any disclaimer, the term of this patent is extended or adjusted under 35 U.S.C. 154(b) by 0 days.

(21) Appl. No.: 17/342,074

(22) Filed: Jun. 8, 2021

(65) Prior Publication Data

US 2022/0388118 A1 Dec. 8, 2022

(51) Int. Cl.
*B24B 57/02* (2006.01)
*B08B 3/02* (2006.01)
*B24B 1/00* (2006.01)

(52) U.S. Cl.
CPC ................ *B24B 57/02* (2013.01); *B08B 3/02* (2013.01); *B24B 1/00* (2013.01); *B08B 2203/007* (2013.01); *B08B 2203/0217* (2013.01); *B08B 2230/01* (2013.01)

(58) Field of Classification Search
CPC ..................................................... D06F 39/008
See application file for complete search history.

(56) References Cited

U.S. PATENT DOCUMENTS 425,165 A * 4/1890 Doty ......................... B05B 1/28 239/525
625,865 A * 5/1899 Yeo ....................... B08B 9/0321 15/406
630,320 A * 8/1899 Billow .................... B05B 9/002 239/417
3,878,856 A * 4/1975 Hall ...................... A47L 15/243 134/80
4,561,903 A * 12/1985 Blaul .................... B08B 15/026 454/56
5,401,328 A * 3/1995 Schmitz .................... B08B 3/02 134/200
6,115,541 A * 9/2000 Rhodes ..................... B08B 3/02 134/96.1
8,939,382 B1 * 1/2015 Finger .................. G05D 7/0682 239/128
9,775,487 B2 10/2017 Nelson
2009/0194029 A1 * 8/2009 Persson ................. B08B 9/0321 119/14.08
2013/0306111 A1 * 11/2013 Myers ....................... B08B 3/02 134/32
2015/0196937 A1 * 7/2015 Nelson ................ A47L 15/0015 137/7
2016/0175051 A1 * 6/2016 Matta ..................... C11D 7/263 510/161

(Continued)

FOREIGN PATENT DOCUMENTS

CN 110090831 A * 8/2019
WO WO-2022033927 A1 * 2/2022

*Primary Examiner* — Spencer E. Bell
*Assistant Examiner* — Omair Chaudhri
(74) *Attorney, Agent, or Firm* — Scherrer Patent & Trademark Law, P.C.; Stephen T. Scherrer; Monique A. Morneault

(57) ABSTRACT

The present invention relates to accessories. Specifically, the present invention relates to cleaning accessories such as jewelry that have small crevices, impressions, engravings, or other fine details that are difficult to reach and clean. Even more specifically, the present invention relates to polishing and drying the cleaned accessories by using an allotment of polishing compound and/or steam.

19 Claims, 3 Drawing Sheets

(56) References Cited

U.S. PATENT DOCUMENTS

| | | | | |
|---|---|---|---|---|
| 2018/0313617 | A1* | 11/2018 | Harris | F24F 11/83 |
| 2019/0159570 | A1* | 5/2019 | Hsieh | F22B 3/02 |
| 2020/0238309 | A1* | 7/2020 | Stafford | F01D 9/02 |
| 2021/0035812 | A1* | 2/2021 | Kim | C09G 1/02 |
| 2021/0046602 | A1* | 2/2021 | Wu | B24B 55/03 |
| 2022/0017047 | A1* | 1/2022 | Gulde | B08B 3/02 |
| 2022/0105546 | A1* | 4/2022 | Nelson | B05B 1/005 |
| 2023/0016783 | A1* | 1/2023 | Eggler | B08B 9/093 |

* cited by examiner

APPARATUS, SYSTEMS AND METHODS FOR CLEANING AND POLISHING ACCESSORIES

TECHNICAL FIELD

The present invention relates to accessories. Specifically, the present invention relates to cleaning accessories that have small settings, crevices, impressions, engravings, or other fine details that are difficult to reach and clean. Even more specifically, the present invention relates to sanitizing, polishing, washing, rinsing and drying the cleaned accessories.

BACKGROUND

It is, of course, generally known that it is difficult to sanitize, wash, polish, clean, rinse and dry to perfection, in one step, with conventional methods, accessories such as jewelry, gemstones, glasses, lens, etc. Commonly, accessories are cleaned and polished by hand using brushes, solutions, or cleaning devices. Brushes can be effective ways of removing grime, tarnish or other material, but are generally a more abrasive method of cleaning. Additionally, brushes don't get into small crevices, settings, or underneath stones and gems. Brushes can be or become coarse and damage small accessories, sometimes without knowing of or seeing the damage. Once an accessory is damaged it may be impossible or extremely expensive to fix. A need exists for an apparatus, system, and method for delicately and completely cleaning accessories including small crevices, settings, and underneath stones and gems.

Home cleaning solutions are a common alternative to cleaning accessories by brush. Often these home cleaning solutions involve using vodka, Alka-Seltzer, window cleaner, vinegar, toothpaste, ketchup, denture tablets, club soda, beer, baking soda, ammonia, powdered detergent and aluminum foil. Different solutions are generally used for different accessories. Using the wrong solution could damage or destroy the accessory the solution is used on. Similarly, using too much of a solution or applying the solution for too long can also damage the accessory. A need exists for an apparatus, system, and method for controlling the amount of solution used.

Regularly, cleaning devices such as ultrasonic cleaners or steam cleaners are used to clean accessories. Ultrasonic cleaners generally work by sending ultrasonic waves through liquids such as water, cleaner, or other chemical liquids. As the ultrasonic waves pass through the liquids, bubbles form around an accessory and pull dirt, grime, or other material from the accessory. The bubbles leave the accessory and remove the dirt, grime, tarnish, or other material. An accessory must be freely suspended using ultrasonic cleaning so that the liquid can surround the accessory on all sides. Commonly, ultrasonic cleaning does not sterilize the accessories it cleans, leaving harmful microbial life such as spores, bacterial, viruses, etc. A need exists for an apparatus, system, and method for sterilizing the entire accessory.

It is commonly known to use steam cleaners to clean and sterilize accessories. Steam cleaners can heat water to temperatures above boiling, such as 115-155 degrees Celsius or 240-310 degrees Fahrenheit. The water vapor produced by the heating can be compressed, pressurized, and thereafter exposed to accessories. The hot water vapor cleanses surfaces by breaking the bonds of soil, grime, tarnish, or other materials that cling to the accessory. Steam cleaners do not require chemical or cleaning solutions in order to clean and sterilize accessories. Even still, once an accessory is cleaned and sterilized, the accessory often needs to be polished to look its best. Ultrasonic and steam cleaners fail to polish accessories. A need, therefore, exists for an apparatus, system, and method for cleaning and polishing an accessory.

Generally, brushes or cloths are used to polish accessories. It is common to use an electric polisher to polish accessories, which is usually a circular brush or cloth connected to a motor. As the motor revolves the circular brush or cloth, an accessory may be pressed against the rotating brush or cloth to polish the accessory. This can be difficult to manage because an accessory may be thrown at a high velocity if it's not held securely. Also, as mentioned earlier, using brushes or cloths may damage an accessory. Further, this adds an extra step to the cleaning process. You may have to polish an accessory after cleaning and/or you may have to clean an accessory after polishing. A need, therefore, exists for an apparatus, system, and method for safely and easily cleaning and polishing an accessory.

SUMMARY OF THE INVENTION

The present invention relates to accessories. Specifically, the present invention relates to cleaning accessories such as jewelry that have small crevices, impressions, engravings, or other fine details that are difficult to reach and clean. Even more specifically, the present invention relates to polishing and drying the cleaned accessories by using an allotment of polishing compound and/or steam.

The terms "mix," "mixed," "mixing," and "mixture" used herein are used to define varying levels of two compounds combined together. Applicant intends that each compound to be "mixed" may vary between 0% and 100% such that the combination could be all of one compound and none of the other, half one compound and half the other, any variance therebetween, or any other combination thereof.

To this end, in an embodiment of the present invention, a cleaning and polishing apparatus is provided. The cleaning and polishing apparatus comprises a water tank capable of holding water and steam, a compound tank, a mixing valve disposed between the compound tank and water tank for combining water and compound, and a nozzle for expelling a gaseous mixture of water and compound.

In an alternate embodiment of the present invention, a system for cleaning and polishing an accessory is provided. The system comprises a cleaning and polishing apparatus comprising a water tank capable of holding water and steam, a compound tank, a mixing valve disposed between the compound tank and water tank for combining water and compound, and a nozzle for expelling a gaseous mixture of water and compound, an accessory, and an accessory tray disposed beneath the nozzle, wherein the accessory tray is capable of holding the accessory for cleaning and polishing the same.

In an alternate embodiment of the present invention, a method for cleaning and polishing an accessory is provided. The method comprises the steps of providing a cleaning and polishing apparatus comprising a water tank capable of holding water and steam, a compound tank, a mixing valve disposed between the compound tank and water tank for combining water and compound, and a nozzle for expelling a mixture of steam and compound, providing an accessory, adjusting the mixing valve to a desired allotment of steam and compound, and opening the release valve exposing the accessory to the desired allotment of steam and compound.

It is, therefore, an advantage and objective of the present invention to provide an apparatus, system, and method for delicately and completely cleaning accessories including small crevices, settings, and underneath stones and gems.

Moreover, it is an advantage and objective of the present invention to provide an apparatus, system, and method for controlling the amount of solution used.

Also, it is an advantage and objective of the present invention to provide an apparatus, system, and method for sterilizing the entire accessory.

Furthermore, it is an advantage and objective of the present invention to provide an apparatus, system, and method for cleaning and polishing an accessory.

Likewise, it is an advantage and objective of the present invention to provide an apparatus, system, and method for safely and easily cleaning and polishing an accessory.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present invention relates to accessories. Specifically, the present invention relates to cleaning accessories such as jewelry that have small crevices, impressions, engravings, or other fine details that are difficult to reach and clean. Even more specifically, the present invention relates to polishing and drying the cleaned accessories by using an allotment of polishing compound and/or steam.

Figure 1:
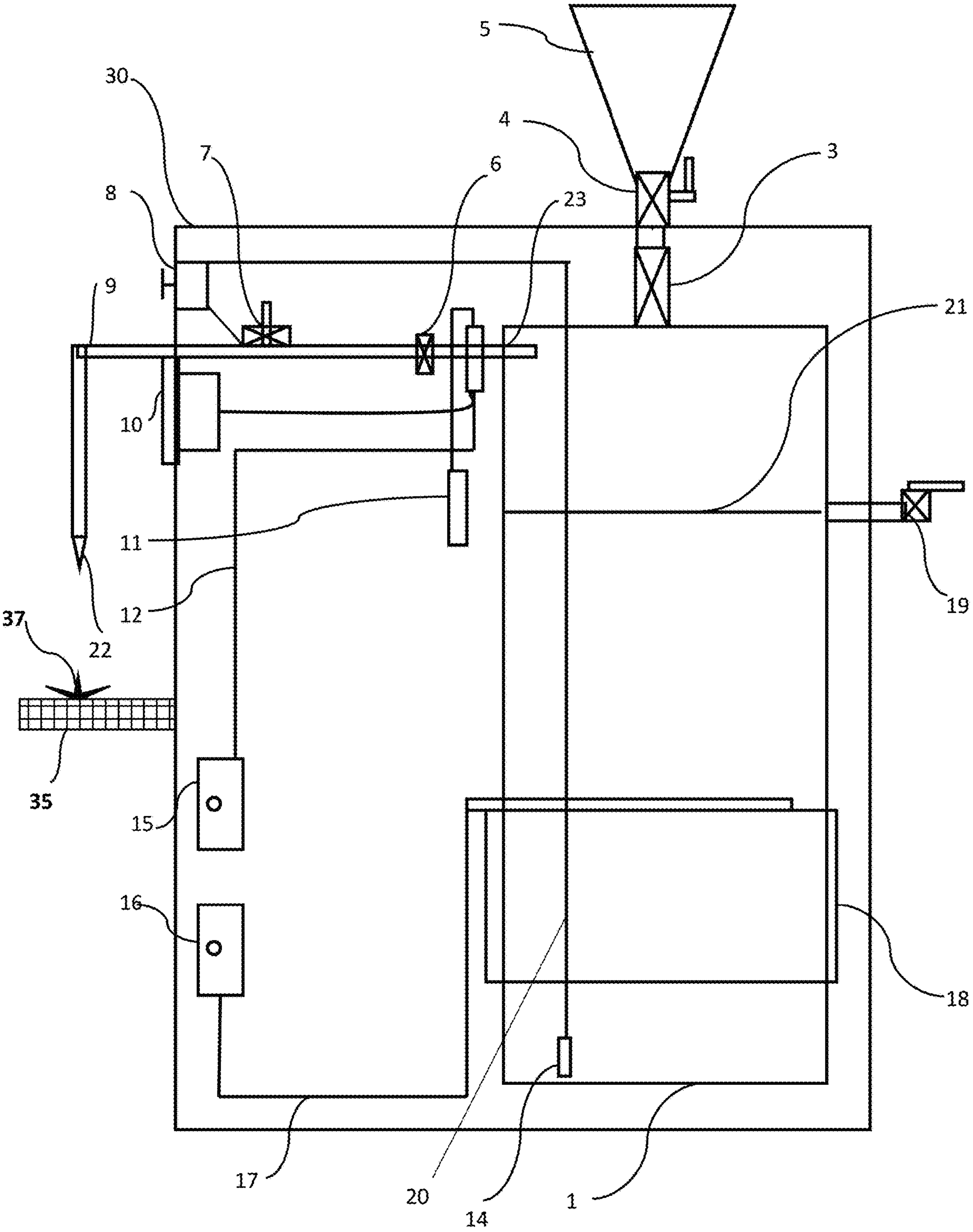
FIG. 1 illustrates a schematic of a cleaning and polishing apparatus in an embodiment of the present invention.

Now referring to the figures, wherein like numerals refer to like parts, FIG. 1 illustrates a cleaning and polishing apparatus 30. The cleaning and polishing apparatus 30 may be a self-contained unit as shown in FIG. 1. A water/cleaning compound tank 1 may be disposed at a location inside the cleaning and polishing apparatus 30. The tank 1 may be filled by using a funnel 5 and opening a fill valve 4. Once tank 1 is filled, the funnel 5 may be removed and the fill valve 4 may be closed. Of course, additional filling methods known to one skilled in the art may be used such as using a cup, having a direct line of water, using a hose, or other known filling technique. The tank 1 may have a blowout preventer 3 disposed between the fill valve 4 and the water tank 1 to prevent air, water, and/or steam from being expelled from the fill valve 4.

The tank 1 may be able to hold an amount of water and cleaning compound 14. Preferably, the water may not exceed a maximum water level 21. To make sure no water exceeds the maximum water level 21, a release valve 19 may be provided. The release valve 19 may be operated manually, mechanically by opening at a determined water level or pressure, or electronically by monitoring the water level 21 with electronic sensors. The release valve 19 may be opened and may allow air and/or water to flow therethrough. Consequently, the release valve 19 may allow any water in excess of the maximum water level 21 to flow out of the release valve 19. The release valve 19 may be closed thereafter.

The tank 1 may be heated by a heating band 18 that may be disposed around the tank 1. As the water within the tank 1 is heated, steam may form within the tank 1. The tank 1 may be heated at the request of a user through an input switch 15. A thermostat 16 may regulate the temperature of the tank 1 once the input switch 15 has been engaged. The temperature may be locked so that a user may not increase the temperature above safe levels. A specific temperature may be set by a factory skilled technician when the cleaning and polishing apparatus 30 is manufactured, when the cleaning and polishing apparatus 30 is repaired, of the like.

The thermostat 16 may have an electrical connection 17 to the heating band 18 such that the heating band 18 heats to the temperature set by the thermostat 16. The heating band 18 may stay on until the thermostat 16 is lowered or the cleaning and polishing apparatus 30 is turned off. Alternatively, the heating band 18 may turn off automatically after a period of time. The heating band 18 may further fluctuate in temperature so long as the temperature of the water is maintained at the temperature set by the thermostat 16. Alternatively, the cleaning and polishing apparatus 30 may be programed to heat to a pre-determined temperature or to a pre-determined pressure. Of course, other methods of heating the tank 1 may be utilized without departing from the scope of the present invention.

As the tank 1 is heated, the water therein may boil and form water vapor or steam. As a result, the pressure in the tank 1 may rise. The pressure may be predetermined by a qualified technician when manufactured, such as at a few atmospheres or within a range such as 60-80 pounds per square inch. Of course, higher or lower pressures may be used and higher or lower certified tanks may be used to accommodate said higher or lower pressures. The pressure inside the tank 1 may be displayed on a gauge 10, disposed on the outside of the cleaning and polishing apparatus 30. If the pressure exceeds a pressure limit on the tank 1 or a pre-determined pressure limit, a safety valve 11 may release the excess pressure until the desired pressure is maintained. Of course the safety valve 11 may release excess pressure in alternative scenarios, such as mechanical or electrical malfunction, so as to protect the user and the cleaning and polishing device 30.

The tank 1 may further hold an amount of compound mixed with the water, generally at the bottom of tank 1. The compound may be a cleaning solution, a polishing solution, or similar enhancing compound known to one skilled in the art. The compound may be similarly filled within the tank 1 using the funnel 5 and opening the fill valve 4. The tank 1 may be emptied by opening fill valve 4 and flipping the cleaning and polishing apparatus 30 upside down and removing the liquid therein. The tank 1 may be refilled after prolonged use of the cleaning and polishing apparatus 30.

Water and compound may be mixed together within tank 1 and withdrawn from the tank 1 via line 20, which may withdraw the water and compound mixture from the bottom of the tank 1. Therefore, the line 20 may have a terminal end and opening at or near the bottom of the tank 1 so as to ensure that a robust mixture of compound and water is withdrawn through the line 20. Preferably, the terminal end of the line 20 may terminate a short distance from the bottom of the tank 1, specifically about ½" from the bottom of the tank 1, although the distance should not be limited as described herein. Disposed on the terminal end opening of the line 20 may be a screen 14 or other like element that allows water and polishing compound to flow therethrough, but blocks larger polishing compound pieces or impurities that may be contained within the tank 1. Steam may be generated within the tank 1, as described above, and withdrawn from the tank 1 via line 9, specifically via opening 23 at or near the top of the tank 1.

Thus, the water and compound may be mixed in tank 1 and then mixed together with the steam from tank 1 without requiring separation of the compound and the steam in separate tanks. A mixing valve 8 may be disposed near the outside of the cleaning and polishing apparatus 30 so a user may control the same. The mixing valve 8 may draw and control a flow of a mixture of water and compound that may be disposed at the bottom of tank 1, thereby mixing the water and compound mixture with steam drawn into line 9 via a solenoid valve 7, solenoid valve 6, or combination of solenoid valve 7 and solenoid valve 6, or other valve. Therefore, the water and compound mixture from the bottom of tank 1 may be mixed with the steam generated within the top of the tank 1 to form a steam and compound mixture that is expelled from the cleaning and polishing apparatus 30 via nozzle 22, which may be used to clean an accessory 37, which may preferably be an item of jewelry.

Figure 2:
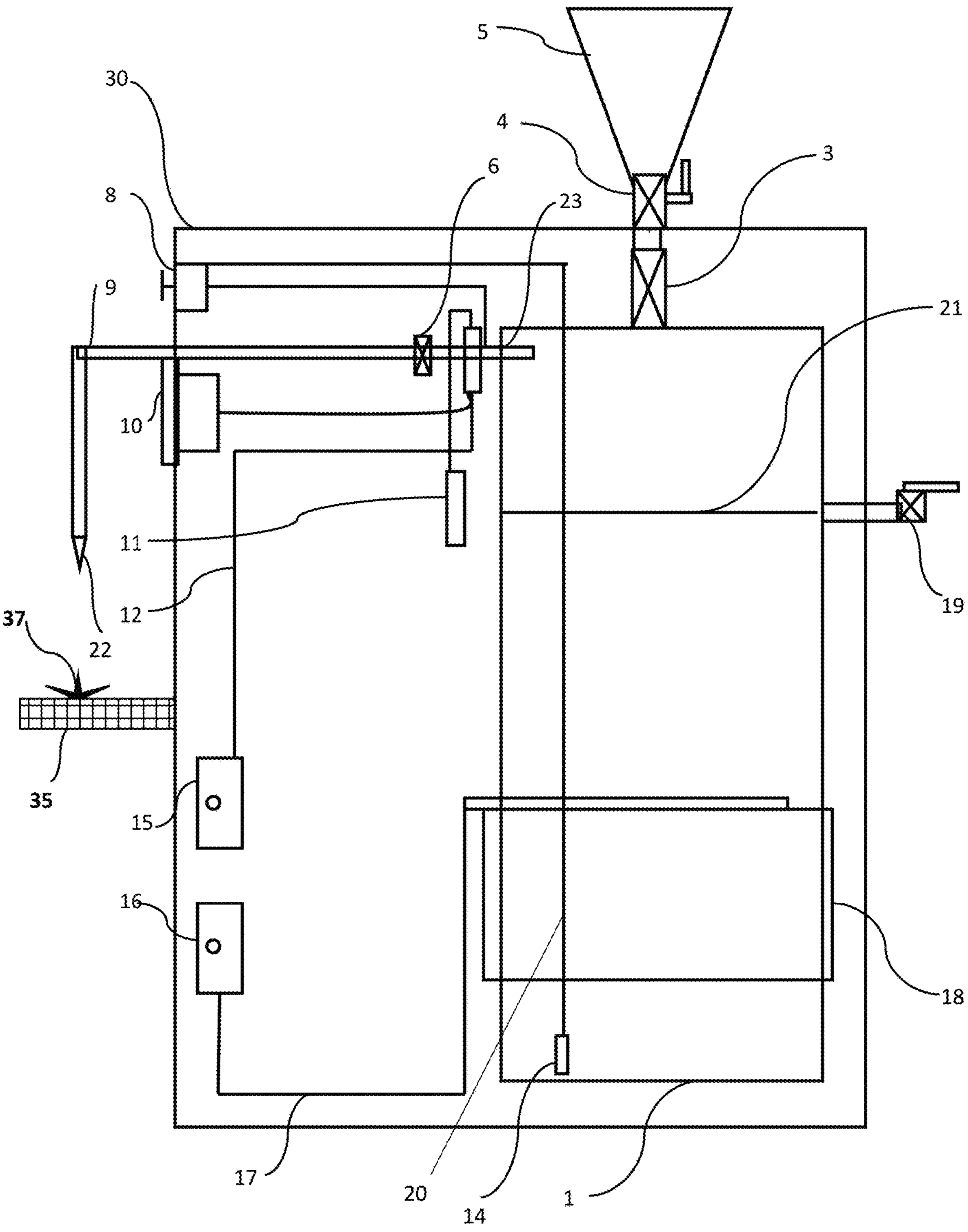
FIG. 2 illustrates a schematic of a cleaning and polishing apparatus in an alternate embodiment of the present invention.
Figure 3:
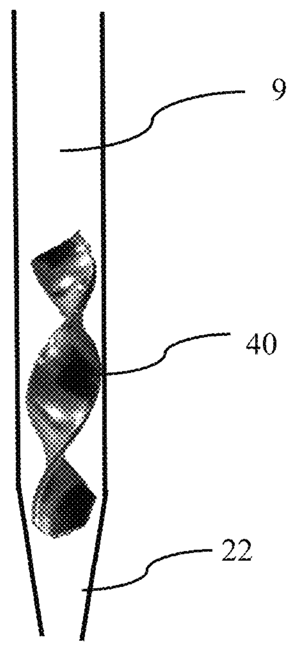
FIG. 3 illustrates a close-up internal view of a nozzle of a cleaning and polishing apparatus in an embodiment of the present invention.

The mixing valve 8 may control the amount of water and compound mixture may be added to the steam drawn from the tank 1 to increase or decrease the amount of compound that may be utilized to clean the accessory 37. The introduction of steam into line 9 from the water tank 1 may force the steam, water, and compound 14 to exit line 9 through the nozzle 22, where an accessory 37 is to be polished and cleaned. As steam enters line 9 through opening 23, the water in tank 1 may be superheated to create more steam and maintain the pressure in the water tank 1. The compound solenoid valve 7, or other alternate valve and steam solenoid valve 6, or other alternate valve may be turned off and may prevent anything from reaching nozzle 22. The compound solenoid valve 7, or other alternate valve and steam solenoid valve 6, or other alternate valve may alternately be turned on and off automatically at a predetermined pressure, time, or other indicator known to one skilled in the art, or may be turned on and off manually by a user. Alternatively, the mixing valve 8 may bypass solenoid valve 7 (as illustrated in FIG. 2, wherein the solenoid valve 7 is not shown) and wherein the mixing valve output connects to line 9 just upstream of solenoid valve 6. In such a configuration, the mixing valve 8 is used to adjust the compound/water mixture added to the steam through line 9, and solenoid valve 6 may be used to open to allow the flow of the compound/water mixture and steam combination, and close when desired to prevent the flow of the steam and compound/water mixture combination.

At the opening 23 within tank 1 of line 9, an obstruction may be present that increases the pressure, and thereby the flow, of the steam. The increased pressure of the steam within line 9 due to the obstruction may ultimately increase the flow of the steam, water, and/or compound 14 that is expelled from line 9 via the nozzle 22. The obstruction may be disposed anywhere between the steam solenoid valve 6 and the opening 23 in the line 9 that maximizes the efficiency of the cleaning and polishing apparatus. In one embodiment, as shown in FIG. 1, the obstruction may be at a location furthest from the steam solenoid valve 6. In a preferred embodiment, the obstruction may be located 1.5 inches in from the opening 23.

The nozzle 22 may be tapered into a cone such that the combination is expelled at a high velocity. Moreover, the nozzle may further include a flat, twisted element 40, such as a flat piece of metal that is deformed and twisted into a spiral pattern and held adjacent or within the nozzle 22, thereby inducing a cyclonic steam and compound flow from the nozzle 22. The accessory 37 may be held beneath nozzle 22 with a holding tool or alternatively the accessory 37 may be held in a basket or tray or other accessory holder 35 disposed beneath the nozzle 22. In one embodiment, a user may clean and polish the accessory 37 by placing it beneath the nozzle 22. The user may select a combination of steam and compound 14 using mixing valve 8. The temperature and the pressure may automatically adjust to factory set values upon a user engaging the input switch 15. These factory set values may be determined by a skilled technician during manufacturing, during repair, or the like. Once the cleaning and polishing apparatus 30 has enough pressure, a quantity of steam, water, and compound 14 may enter into line 9. The resulting combination in line 9 may be expelled from the nozzle 22 and may clean and polish the accessory. Alternatively, the cleaning and polishing apparatus 30 may expel only steam, such as when the compound is completely diluted. Steam may flow through line 9 without any compound 14 and may be expelled from nozzle 22. The steam-only flow may rinse and dry the accessory, leaving it shiny, clean, and like new. Of course, a user may use the mixing valve 8 to prevent water from entering the compound tank 2. This may allow a user to encompass the accessory with a less diluted compound 14 if desired.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. An accessory sanitizing, polishing, cleaning, rinsing and drying apparatus, the apparatus comprising:

a tank having steam within a space at a top of the tank, and water and an amount of polishing compound therein forming a water and polishing compound mixture at a bottom of the tank;

a heating element contacting the tank;

a first line having a terminal end comprising a first valve for controlling a flow of steam through the first line from the tank;

a second line having a terminal end disposed adjacent the bottom of the tank and disposed within the water and polishing compound mixture at the bottom of the tank, the second line in fluid connection with the first line;

a mixing valve connected to the second line, wherein the mixing valve mixes an amount of the water and polishing compound mixture withdrawn from the tank via the second line with steam withdrawn via the first line forming a steam and polishing compound mixture; and a nozzle in fluid connection with the second line configured to expel only steam when only the first valve is opened and a combination of the steam and the amount of the water and polishing compound mixture when both the first valve and the mixing valve are opened, wherein the apparatus further comprises no additional pressurized or heated tanks.

2. The apparatus of claim 1 wherein the first valve is a first solenoid valve.

3. The apparatus of claim 1 wherein the terminal end of the second line comprises a screen.

4. The apparatus of claim 1 further comprising a pressure gauge that indicates the pressure of the water tank.

5. The apparatus of claim 1 further comprising controls for regulating temperature and pressure within the tank.

6. The apparatus of claim 1 further comprising:

a twisted element within the nozzle configured to induce a cyclonic rotation in the steam and polishing compound mixture as the steam and polishing compound mixture is expelled from the nozzle.

7. An accessory sanitizing, polishing, cleaning, rinsing and drying system, the system comprising:

an accessory cleaning and polishing apparatus, the apparatus comprising a tank having steam within a space at a top of the tank, and water and an amount of polishing compound therein forming a water and polishing compound mixture at a bottom of the tank; a first line having a terminal end comprising a first valve for controlling a flow of steam through the first line from the tank; a second line having a terminal end disposed adjacent a bottom of the tank and disposed within the water and polishing compound mixture at the bottom of the tank, the second line in fluid connection with the first line; a mixing valve connected to the second line, wherein the mixing valve mixes an amount of the water and polishing compound mixture withdrawn from the tank via the second line with steam withdrawn via the first line forming a steam and polishing compound mixture; and a nozzle in fluid connection with the second line configured to expel only the steam when only the first valve is opened and a combination of the steam and the amount of the water and polishing compound mixture when both the first valve and the mixing valve are opened wherein the apparatus further comprises no additional pressurized or heated tanks;

an accessory holder disposed on the outside of the apparatus and beneath the nozzle, wherein the accessory holder holds an accessory for cleaning and polishing the same.

8. The system of claim 7 further comprising an accessory disposed in the accessory holder.

9. The system of claim 7 further comprising controls for manually setting temperature and pressure within the tank.

10. The system of claim 7 wherein the first valve is a first solenoid valve.

11. The system of claim 7 further comprising a second valve in fluid connection with the first line and the second line, wherein the second valve controls the combination of the steam from the first line and the mixture of water and polishing compound from the second line.

12. The system of claim 7 further comprising an obstruction disposed within the first line.

13. The system of claim 12 wherein the obstruction is disposed 1.5 inches in from a first end of the first line.

14. An accessory sanitizing, polishing, cleaning, rinsing, and drying method, the method comprising the steps of:

providing an accessory cleaning and polishing apparatus, the apparatus comprising: a tank having steam within a space at a top of the tank, and water and an amount of polishing compound therein forming a water and polishing compound mixture at a bottom of the tank; a first line having a terminal end comprising a first valve for controlling a flow of steam through the first line from the tank; a second line having a terminal end disposed adjacent a bottom of the tank and disposed within the water and polishing compound mixture at the bottom of the tank, the second line in fluid connection with the first line; a mixing valve connected to the second line, wherein the mixing valve mixes an amount of the water and polishing compound mixture withdrawn from the tank via the second line with steam withdrawn via the first line forming a steam and polishing compound mixture; and a nozzle in fluid connection with the second line configured to expel only the steam when only the first valve is opened and a combination of the steam and the amount of the water and polishing compound mixture when both the first valve and the mixing valve are opened wherein the apparatus further comprises no additional pressurized or heated tanks;

drawing the steam from the tank via the first line;

drawing the amount of water and polishing compound mixture from the tank via the second line;

mixing the amount of water and polishing compound mixture with the steam forming a steam and polishing compound mixture; and expelling the steam and polishing compound mixture through the nozzle.

15. The method of claim 14 further comprising the steps of:

heating the water tank to a first temperature; and activating the first solenoid valve to introduce the steam into the first line.

16. The method of claim 15 further comprising the steps of:

activating the mixing valve to introduce the water and the polishing compound mixture to the steam.

17. The method of claim 14 further comprising the steps of:

pressurizing the water tank to a first pressure;

activating a first solenoid valve to introduce the steam into the first line; and activating a second solenoid valve to introduce the water and the polishing compound mixture into the first line from the second line via the mixing valve.

18. The method of claim 14 further comprising the steps of:

providing a release valve extending from the water tank outside of the accessory cleaning and polishing apparatus;

opening the release valve; and starting a flow of water therefrom.

19. The method of claim 14 further comprising the steps of:

providing a safety valve extending from the first line to outside of the accessory cleaning and polishing apparatus; and opening the safety valve to release excess pressure.

* * * * *